US 6,577,690 B1

(12) United States Patent
Barman et al.

(10) Patent No.: US 6,577,690 B1
(45) Date of Patent: Jun. 10, 2003

(54) CLOCK RECOVERY IN MULTI-CARRIER TRANSMISSION SYSTEMS

(75) Inventors: Kaushik Barman, Bangalore (IN); Mandayam T. Arvind, Bangalore (IN)

(73) Assignee: Silicon Automation Systems Limited, Bangalore (IN)

( * ) Notice: Subject to any disclaimer, the term of this patent is extended or adjusted under 35 U.S.C. 154(b) by 0 days.

(21) Appl. No.: 09/333,801

(22) Filed: Jun. 15, 1999

Related U.S. Application Data
(60) Provisional application No. 60/090,902, filed on Jun. 25, 1998.

(51) Int. Cl.[7] ................................................. H04L 7/00
(52) U.S. Cl. ....................................... 375/354; 375/356
(58) Field of Search ................................. 375/219, 222, 375/221, 220, 240.28, 254, 285, 346, 356, 358, 381, 316; 370/210, 278, 281, 282, 286, 289, 295

(56) References Cited

U.S. PATENT DOCUMENTS

| | | | | |
|---|---|---|---|---|
| 5,793,801 A | * | 8/1998 | Fertner ........................ | 375/219 |
| 5,828,954 A | * | 10/1998 | Wang ......................... | 455/260 |
| 5,969,777 A | * | 10/1999 | Mawatari .................... | 348/607 |
| 5,991,273 A | * | 11/1999 | Abu-Dayya ................. | 370/252 |
| 6,141,317 A | * | 10/2000 | Marchok et al. ............ | 370/207 |
| 6,219,095 B1 | * | 4/2001 | Zhang et al. ............... | 348/192 |
| 6,219,378 B1 | * | 4/2001 | Wu ............................ | 370/484 |
| 6,249,543 B1 | * | 6/2001 | Chow ........................ | 370/468 |
| 6,327,314 B1 | * | 12/2001 | Cimini et al. ............... | 342/378 |
| 6,467,092 B1 | * | 10/2002 | Geile et al. ................. | 725/131 |

* cited by examiner

Primary Examiner—Bayard Emmanuel
(74) Attorney, Agent, or Firm—Welsh & Katz, Ltd.

(57) ABSTRACT

A method and apparatus is provided that computes an optimal estimate of known clock frequency error between the transmitter and receiver using a known pilot signal and the statistics of the noise process. The estimate is computed such that the residual clock error is below the least count (the smallest frequency correction that can be imparted) of the VCXO that controls the receiver sample clock. A tracking technique based on a measure of drift in taps of frequency domain equalizers of different sub-carriers is disclosed. This tracking ensures that the residual mean square error is within a predefined bound. Finally, the least count effects in digitally controlled oscillators (DAC controlled VCXOs and Numerically Controlled Oscillators (NCXO)) are addressed by a dithering mechanism. The dithering mechanism involves imparting positive and negative clock corrections for different lengths of time in such a manner that the residual clock error becomes zero mean. In data mode, a tracking scheme makes uses of variations in frequency domain equalizer taps for determination of clock error estimates, computes a residual clock error estimate different from the clock error estimate generated from pilot channel using training mode scheme, and SNR based combination of errors is computed to obtain clock correction, and a dithering mechanism computes the actual correction to be given to the VCXO such that the residual phase error is maintained at an acceptably low value.

19 Claims, 9 Drawing Sheets

Estimation of Clock Error during Training Mode.

Figure 1. Multicarrier Communication System over a Subscriber Loop.

Figure 2. Estimation of Clock Error during Training Mode.

Figure 3. Estimation of Clock Error during Data Mode.

Figure 4. Data Mode Clock Recovery.

CLOCK RECOVERY IN MULTI-CARRIER TRANSMISSION SYSTEMS

This is a continuation of provisional application Ser. No. 60/090,902 filed on Jun. 25, 1998.

BACKGROUND OF THE INVENTION

1. Field of the Invention

This application pertains generally to data communication systems and more specifically to the field of clock recovery in multi-carrier systems.

2. Description of the Background Art

A multi carrier transmission system is one that employs frequency division multiplexed (FDM) sub-carriers for transmission. A comprehensive description of multicarrier systems is given by John A. C. Bingham in "Multicarrier Modulation for Data Transmission: An idea whose time has come", IEEE Communication Magazine, Vol. 28, No. 5, pp. 5–14, May 1990.

In conventional communication systems a receiver has to perform clock and carrier recovery. However typical multicarrier systems use lookup tables for generating individual carriers through a sample clock. As a result carrier frequencies are dependent on the clock frequency. Therefore independent carrier frequency recovery is not required.

Clock recovery is the problem of synchronizing a receiver's clock to that of the transmitter. The problem of clock recovery is however made complicated by the presence of channel noise, frequency offset, clock drift and phase jitter. Channel noise comprises thermal noise and noise induced due to other similar systems existing in that environment. Frequency offset can arise due to other communication equipment present in the channel. These equipment in modulation and subsequent demodulation may shift the signal spectrum, as described by John A. C. Bingham in "Method and Apparatus for Correcting for Clock and Carrier Frequency Offset and Phase Jitter in Multicarrier Modems", U.S. Pat. No. 5,228,062, herein incorporated by reference, and issued Jul. 13, 1993. Clock drift is caused by crystal imperfections and temperature variations. Phase jitter is mainly attributed to power line coupling, however phase jitter can also arise from crystal imperfections and other circuit limitations. Any clock recovery circuit has to therefore estimate these parameters and then track them in the presence of frequency offset, clock drift and phase jitter.

In the past many schemes have been suggested for addressing the above problems. Almost all of these techniques are based on the use of phase locked loops (PLLs). These schemes work well in general, however the loop filters need to be designed carefully to provide the required performance. In multicarrier systems the symbol periods are typically large and corresponding PLL delays would also be large, making the tracking problem difficult.

The clock recovery problem in multicarrier systems has been addressed by U.S. Pat. No. 5,228,062 issued Jul. 13, 1993. In this method, a combination of block and serial processing techniques have been proposed for compensating offset and jitter. These schemes use a plurality of pilot tones during an initial training mode for estimation of clock error, frequency offset and phase jitter components. The training mode is followed by a data mode, during which the actual data is encoded into symbols (referred to as data mode symbols here in after) and transmitted through the channel. In data mode, the clock error due to clock drift, frequency offset and phase jitter estimates are updated using data mode symbols. This scheme and its limitations are described below.

The clock error estimation is done by first fitting a straight line to the phase error profile of the received symbols. The straight line fit is typically carried out in a linear least square sense, where the parameters of the straight line are found in such a way that the square of the error between the resulting straight line and the phase error profile is minimum. The slope of the linear fit is then passed through a low pass filter designed using conventional PLL theory to obtain a correction for the clock circuit. This scheme however is limited in performance due to two main reasons:

a) The linear least squares estimation carried out is sub-optimal when the noise in the phase samples is coloured. Noise colouring is relevant in some applications of multicarrier systems, such as those that work in an Asymmetric Digital Subscriber Line (ADSL) environment. In this environment noise resulting from other loops in the same binder is coloured and moreover is a dominant component of the total received noise. Further description of the noise in an ADSL environment can be found in ANSI T1.413-1998, American National Standard for Telecommunications—Network and Customer Installation Interfaces—Asymmetric Digital Subscriber Line (ADSL) Metallic Interface, 1998.

b) The clock recovery and tracking proposed in many conventional systems involve sending a frequency correction to the receiver clock. The correction can be incorporated through a change in the receiver clock or by carrying out interpolation of received samples. Typically a voltage controlled oscillator (VCXO) is controlled through this correction to change the receiver clock. It is customary to provide the VCXO input through a digital to analog converter (DAC) the input to which is the correction value provided as a discrete number. These systems are limited in their ability to provide a continuous range of clock frequencies (since the frequency correction resolution is determined by the smallest non-zero quantity the DAC can output), resulting in a non-zero residual error within the least count of the system. Such an error unless explicitly randomized will manifest as a biased phase error and eventually lead to loss in synchronization and failure. Typical implementations do not address this problem as estimation errors due to system noise and clock jitter provides some degree of randomization.

The measurement of clock error can also be carried out using the scheme proposed by G. Ungerboeck, "Fractional Tap-Spacing Equalizer and Consequences for Clock Recovery in Data Modems", IEEE Tr. Communications, COM-24, No. 8, pp. 856–864, August, 1976. This scheme uses a measure of the drift in the taps of a time domain equalizer to get an estimate of the frequency correction. It is particularly suited for communication receivers that utilize adaptive equalizers. However these schemes cannot be directly applied to high data rate multicarrier systems, as the updation of time domain equalizer taps is computationally expensive.

This invention proposes a novel scheme for clock synchronization in multicarrier systems which addresses the limitations described above, including the effect of channel noise and clock drift on the synchronization problem. The effect of frequency offset and phase jitter is not explored in this invention. However those skilled in the art can combine conventional frequency offset and phase jitter solutions with the novel scheme proposed in this invention for a complete clock recovery.

The proposed scheme also provides two additional features. The first is an optimal method for determining the acquisition time, which is used for reducing the training time. The second is a procedure for optimal tracking of non-stationarity arising out of clock drift.

SUMMARY OF THE INVENTION

In accordance with the present invention, an optimal estimate of clock frequency error between the transmitter and receiver using a pilot signal and the statistics of the noise process is computed during a training mode. In a preferred embodiment, the estimate is such that the residual clock error is below the least count (the smallest frequency correction that can be imparted) of the VCXO that controls the receiver sample clock. The present invention also provides for optimal estimates for systems in which colored noise is introduced, for example, in an ADSL environment. Further, a tracking technique based on a measure of drift in taps of frequency domain equalizers of different sub-carriers is disclosed. This tracking ensures that the residual mean square error is within a predefined bound. Finally, the least count effects in digitally controlled oscillators (DAC controlled VCXOs and Numerically Controlled Oscillators (NCXO)) are addressed by a dithering mechanism. The dithering mechanism preferably involves imparting positive and negative clock corrections for different lengths of time in such a manner that the residual clock error becomes zero mean.

A multicarrier system which consists of a training phase preceding a data transmission phase is provided. The training phase includes a transmission of a known signal in a particular sub-carrier referred to as a pilot channel. This is used to obtain an optimal estimate of the error between the transmitter and receiver clocks in the following way:

1) Determination of the discrete Fourier transform coefficients of the pilot channel which are used to a) obtain the signal to noise ratio (SNR) in the channel and b) obtain the autocorrelation statistics of the noise process.

2) Design of a minimum variance unbiased estimator filter using the SNR, noise autocorrelation statistics and predefined estimation error which could for example be based on the least count of the system that controls the sample clock. This ensures that the filter designed is optimal in the number of samples required for a given noise statistics and estimation error. Alternately, it provides an estimate with minimum variance for a given number of samples and noise statistics. This filter is used for determination of the clock error estimate that is sent as a correction to the receiver clock.

The training phase may also involve determination of the following: a) parameters of the phase jitter and frequency offset components in the system which can be done using techniques described in by U.S. Pat. No. 5,228,062, b) taps of a frequency domain equalizer for compensating the channel characteristics.

The initial estimate is then refined during data mode in the following way:

1) The frequency domain equalizer taps are adapted using a least mean squares (LMS) algorithm using the decoded output as a reference signal. A measure of the drift in these taps is used to obtain an estimate of the residual clock error.

2) If the pilot signal is continued in the data mode, then the scheme deployed during training mode is used to obtain another estimate of the residual clock error.

3) The error estimates obtained in the above steps are combined to obtain a possible clock correction.

4) The correction obtained is input to a dithering algorithm to obtain the actual correction. The dithering algorithm ensures that the phase error does not build up beyond manageable proportions whenever the clock error is below the least count.

The filter is optimal in the number of samples it uses for determination of estimate. This can be used to terminate clock recovery faster than existing schemes, allowing for shorter training times. Conventional phase jitter and frequency offset tracking mechanisms can also be easily combined with the above optimal clock recovery mechanism.

In data mode, a tracking scheme that makes uses of variations in frequency domain equalizer taps for determination of residual clock error estimate, different from the error estimate generation method used in the training mode is disclosed. A SNR based combination of errors is computed to obtain an estimated residual clock correction value. A dithering mechanism computes the actual correction to be given to the VCXO such that the residual phase error is maintained at an acceptably low value.

DETAILED DESCRIPTION OF THE INVENTION

Figure 1:
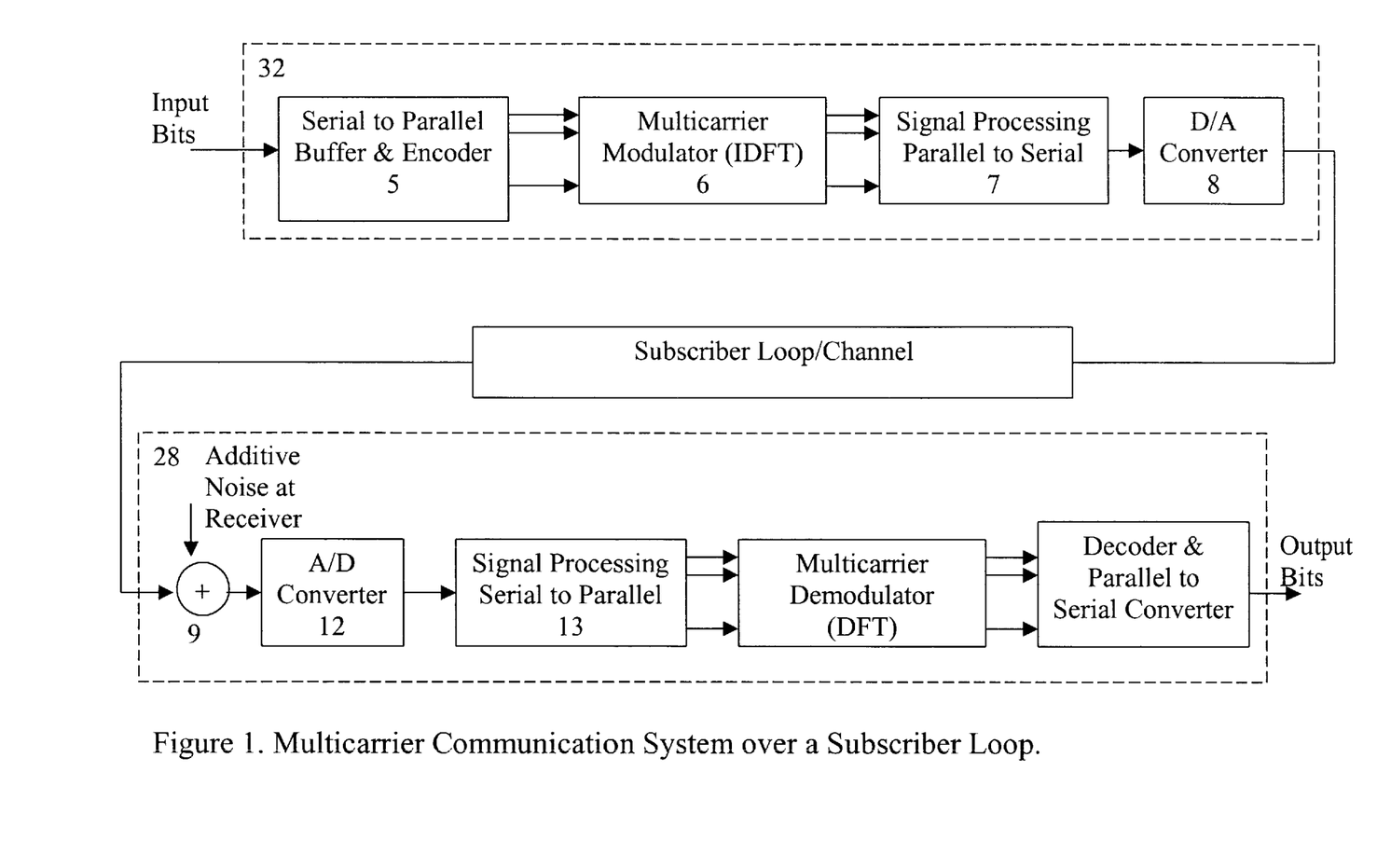
FIG. 1 is a block diagram illustrating a multicarrier communication system and subscriber loop in accordance with the present invention in accordance with the present invention.

The transmitter 32 and receiver 28 units of a multicarrier system connected through a subscriber loop are shown in FIG. 1. The input data bits are passed through a serial to parallel buffer and encoder 5 and modulated using a multicarrier modulator 6. In multicarrier systems, the preferred method of modulation is using the inverse discrete Fourier transform (IDFT). The modulated data may be further processed using other signal processing modules and then converted to serial data 7. This data is transmitted onto the subscriber loop or channel 11 in the analog from using a digital to analog converter (DAC) 8. The noise in the system is shown additive 9 at the receiver end and is usually coloured, comprising crosstalk and thermal noise. At the receiver, the data is converted into digital form using an analog to digital converter (ADC) 12 and processed further before going through a serial to parallel converter 13. This data is demodulated using a multicarrier demodulator 14, decoded and converted to serial mode using a serial converter 15 to obtain the transmit data bits.

The clock recovery problem pertains to matching the sample clocks at the transmit and receive side. The oscillators at the transmitter and receiver for controlling the sampling rate though nominally equal have a frequency difference within a known bound (typically 50 parts per million). The differences arise because of physical characteristics of crystals and temperature variations.

In the following, a software implementation of the clock recovery scheme for training and data mode is proposed. Those skilled in the art would recognize that the schemes could be implemented in hardware, or any convenient combination of hardware and software.

Figure 2:
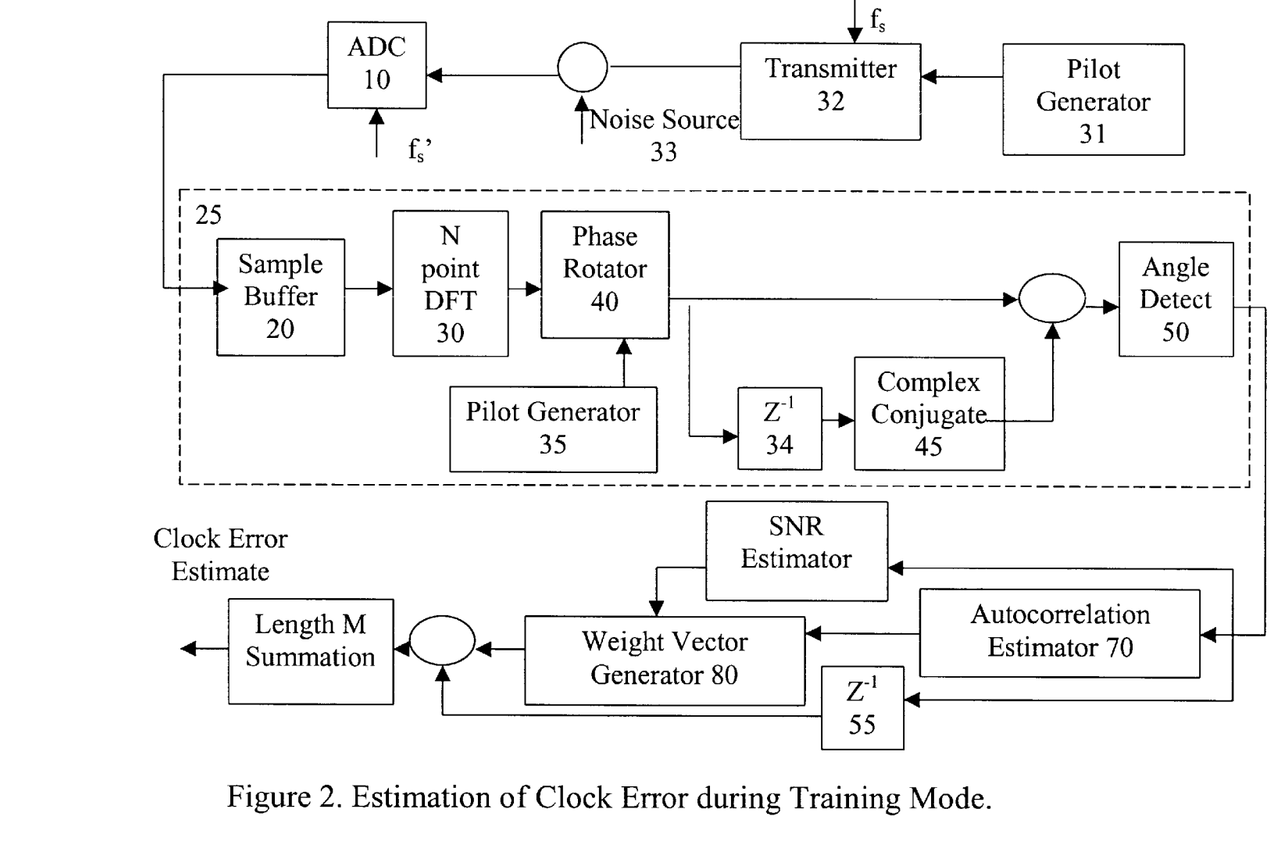
FIG. 2 is a block schematic for the estimation of clock error during the training mode in accordance with the present invention.

Clock recovery mechanisms at the receiver modify the receiver clock so as to synchronize the transmitter and receiver sampling rates. If the sampling rate at the transmitter is indicated by fs, and at the receiver by fs', then the clock recovery mechanism has to estimate delta_f=fs'-fs, which is then sent as a correction to the receiver clock. Typically, fs and fs' are large compared to delta_f. The mechanism for computation of delta_f is divided into two phases, the first phase, training, is described below.
Training phase:

A pilot signal is transmitted as shown in FIG. 2. The pilot is generated using the pilot signal generator 31 and transmitted onto the channel 11 using the transmitter 32. The signal passes through the channel 11 as indicated in FIG. 1. The noise corruption during transmission through the channel is shown as a noise source 33 whose output is added to the channel 11 output. The ADC 12 at the rate fs' samples the received signal corrupted by noise as shown in FIG. 2. Samples for a symbol are collected in a buffer 20 and then input to a phase rotation analyzer 25. In a preferred embodiment, the phase rotation analyzer 25 comprises a DFT module 30 which receives the input signal and computes the DFT coefficients. The phase rotation of the received signal from the transmittal signal, produced by pilot signal generator 35, is computed by the rotator block 40 and output into the arctan computation block 50, after multiplying with the complex conjugate (block 45) of the previous output (block 34) of the phase rotator 40. The arctan block 50 computes the difference between consecutive phase values and inputs the difference into two blocks, the SNR estimator 60 and the autocorrelation estimator 70 for analyzing noise characteristics of the signal. The SNR estimator 60 computes the variance of a given block of input samples and outputs the SNR value. The autocorrelation estimator 70 computes autocorrelations at various lags.

Based on the SNR, autocorrelation values and least count of the control system, denoted by LC, (obtained from system parameters) the minimum variance unbiased estimator (MVUE) block 80 computes the number of taps and their weights for an optimal linear estimate (this method is described subsequently). The samples used for SNR autocorrelation estimation can be reused for computing the final estimate by passing them through a delay unit 55. Using this estimate the clock correction for training mode is derived. The theory for the blocks above is described below.

Note that the individual estimation strategies used in the sequel are only representative; other estimators can be used without changing the overall nature of the scheme, however these will be sub-optimal.

The frequency estimator used in the above scheme is a linear estimate operating on the phase of the received sinusoid. The theoretical lower bound of an unbiased estimator is given by Cramer-Rao lower bound (CRLB). Linear estimators are computationally less expensive and it is possible to design a linear MVUE for frequency estimation problem which can achieve CRLB whenever the SNR is reasonably good (>6 dB), which is so in the case of typical DMT systems.

Let the received signal in a symbol be $$x(i)=s(i)+w(i) \tag{1}$$

where s(i) are the samples of a symbol and w(.) is the additive Gaussian noise.

The following are reasonable assumptions for the ensuing analysis:

A) E[s(i)*w(i)]=0 for all i, i.e. noise is independent of signal.

B) w(.) is wide sense stationary (WSS); in particular, w(.) could be identically distributed with finite variance.

C) E[w(i)]=0 for all i, i.e., w(.) is zero mean.

The procedure for frequency estimation is as follows:

1. DFT coefficient corresponding to pilot channel fc is computed using N samples of the input signal x(.) (use shifting window).

$$y'(k)=\text{sum}(x(N*k+i)*\exp(-j*wc*i)) \quad k=0,1,2,\ldots,M-1 \tag{2}$$
$$i=0$$

where wc=2*pi*fc/fs, fs is the sampling rate.
This corresponds to the block 30.

1.5. The samples y'(k) are rotated by the phase of the transmitted symbol to obtain y(k). This is done in block 40.

2. The variables z(.) are then computed from y(.) as follows:

$$z(k)=\text{angle}(y(k)\text{conj}(y(k-1))) \quad k=1,3,\ldots,M-1.$$

This is done in block 50.

3. A weighting window h of length M−1 is determined. M is obtained from the SNR and noise statistics of z(.), as follows:

In the presence of clock error, the SNR estimated using DFT coefficients does not correspond to the actual SNR. In order to obtain a proper estimate, the variance of the phase noise of DFT coefficients can be computed as follows. Let s(.) in Eq. (1) be a sinusoid of amplitude A and frequency wc. SNR of s(.) is $20*\log(A*N/(2*\sigma))$, where $\sigma^2=E[\Sigma_k w(k)*\exp(-j*wc*k)*\Sigma_1 w'(1)*\exp(j*wc*1)]/(N*N)$ Phase samples of z(.) are obtained at the output of the block 50. Variance of phase noise of DFT coefficients is $\sigma^2_{ph}=\sigma^2/(2*A*A)$. Noise in z(.) corresponds to difference of a white Gaussian process as DFT operation whitens the additive noise. Clearly, variance of the coloured noise corrupting z(.) is $2*\sigma^2_{ph}$. Hence SNR can be computed from the variance estimator of z(.) as:

$$SNR=-10\log(2*\sigma^2_{ph}).$$

Let LC be the least count of clock correction. Further, let f be the frequency being estimated and fs be the sampling rate. If the estimation error e has to be below LC with 95% confidence, it is required that $$3e=2\pi fNLC/fs^2$$

For the phase samples corrupted by white noise, the estimation error is given by $$e^2 = 6/(SNR*M(M^2-1))$$

The value of M can be computed using the above two expressions. In case the noise is coloured, the error expression becomes an indirect function of M and the required value may be computed iteratively.

4. The weight vector for MVUE is given by $$h = R^\wedge(-1)\ ones(M-1)/(\ ones(M-1)'R^{-1}\ ones(M-1))$$

where R is the autocorrelation matrix of the noise corrupting $z(.)$.
ones(M-1) is the column vector of size M-1, whose entries are unity.
For example, when the noise corrupting $y(.)$ is white, the weight vector h can be derived to be:

$$h(i) = 1.5\ M\ (M*M-1)^{-1}\ (1-(2*i-M+2)^2/M^2)\ i=1,2,\ldots,M-1.$$

The weights obtained are used to filter the output of block 50 as shown in block 90. The outputs used for determining the filter parameters can also be used in this step. The filtering is carried out as follows:

$$delta\_f\_est = sum_{i=1\ to\ M-1}\ (z(i)*h(i))\ (fs*fs/(2*pi*fc*N))$$

where $z(.)$ is the output of block 50.

The output of 90 is a clock correction which is used to modify fs'. The modification may be carried out in either the clock input to the ADC through a VCXO or NCXO. It may also be used to modify the interpolator which resamples the output from the ADC.

The initial estimation of phase jitter and frequency offset parameters are also carried out during training mode. One of the ways of estimating the jitter parameters is detailed in by U.S. Pat. No. 5,228,062, issued Jul. 13, 1993.

Tracking clock errors during data mode

In typical implementations of multicarrier receivers, frequency domain equalization is used for channel equalization. In the present embodiment of the invention, the presence of a trained frequency domain equalizer, whose taps are adapted during data mode, is assumed. The clock recovery mechanism in operation during data mode has to find a suitable interval at which clock corrections are provided. The tracking interval is decided based on the SNR, residual jitter, clock drift and other relevant parameters.

Figure 3:
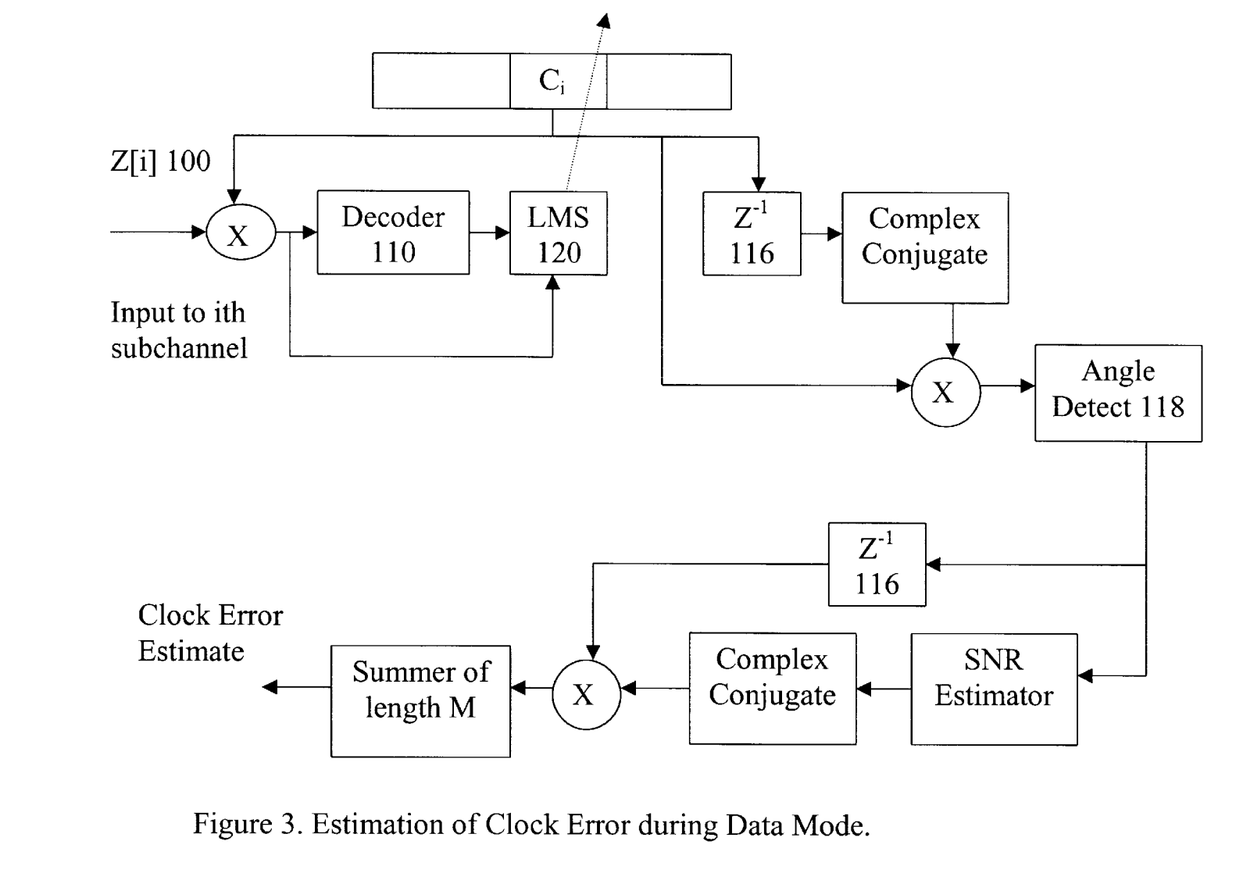
FIG. 3 shows the corresponding schematic for the data mode using the Frequency Domain Equalizer taps in accordance with the present invention.

FIG. 3 gives the block schematic for estimation of clock error using the frequency domain equalizer (FDE) taps. In typical implementations of multicarrier receivers, the FDE taps are updated during data mode, using an algorithm such as LMS. In such a case, a measure of the clock error is obtained using the variation in the equalizer taps themselves. It is customary to adapt the FDE taps using the difference between the FDE outputs and decoder outputs. The demodulated symbol in the ith sub-band 100 is multiplied by the FDE tap $c\_i(n)$, at instant n, to get the output $d\_i(n)$. The symbol is then passed through the decoder 110 (which, in the simplest case, could be a quantizer) to get the decoded symbol $r\_i(n)$. The error between the demodulated and decoded symbol is used to update the tap $c\_i(n)$ 115 using the LMS block 120, with step size mu, to yield the tap for the instance n+1, $c\_i(n+1)$. The delay block 116, complex conjugation block 117, the multiplier 126 and the arctan block 118 compute $z\_i(n) = angle(c\_i(n+1)\ conj(c\_i(n)))$ to obtain the phase difference delta_phi(i) between the taps at successive instances of time. The phase difference, for small mu (which is typical during data mode adaptation), is given by $$delta\_phi(i) = 2*pi*f\_0*mu*delta\_f/fs^2 = c*i*delta\_f$$

where f_0 is the frequency separation between successive sub-bands, $c = 2*pi*f\_0*mu/fs^2$ and delta_phi(i) is the incremental phase due to clock error delta_f.

The estimate of delta_f(i), the clock error as measured in the ith sub-band, is computed over the estimation length N which is computed using SNR and CRLB as described in data mode step 4 above. The estimation is carried out using the delay-block 119, SNR estimator 123, MVUE weight vector generator 122 and the summation unit 121, as in FIG. 2. While the sequel shows the derivation of the estimator for the white noise case, coloured noise can be handled as specified in case of the training mode.

We use $z\_i(.)$ to compute an estimate of delta_phi(i). The expression for determining delta_phi(i) is $$delta\_phi(i) = sum_{j=1\ to\ N-1}\ h(j)*z\_i(j)$$

The clock error estimate from sub-band i is then obtained as $$delta\_f(i) = delta\_phi(i)/(c*i)$$

Having obtained an estimate of clock error in various sub-bands, we now provide a scheme for combining these estimates depending on the estimation error in each sub-band. This scheme results in the estimation error achieving CRLB as shown below:

Let $e\_i$ denote the error in the estimation of delta_f(i) in sub-band i. Then $$E[e\_i] = 0\ and\ E[e\_i^2] = 6/(c^\wedge 2 i^\wedge 2\ SNR\_i\ N^\wedge 3) = b\_i^\wedge 2$$

where SNR_i is the SNR of $c\_i(.)$.

Usually the estimation errors in different subbands are uncorrelated; hence the estimate of timing correction, delta_f', is given by $$delta\_f' = sum_{i=1\ to\ M}\ d\_i\ delta\_f(i)$$

where M is the number of sub-bands over which the tap-based estimator is computed;

$$d\_i = (1/b\_i^\wedge 2)/sum_{i=1\ to\ M}\ (b\ 1/b\_i^\wedge 2),$$

If the SNR in sub-band i is low, $d\_i$ can be set to zero in order to obtain a good correction. The estimator block 150 computes the estimate in accordance with the just mentioned equations.

The estimation error is given by $$E[(delta\_f' - delta\_f)^\wedge 2] = 1/sum_{i=1\ to\ M}(1/b\_i^\wedge 2)$$

which is the same as the CRLB for this estimation problem.

In order to obtain small estimation errors, it is required that the estimation is carried over only those sub-bands that have high SNR.

Figure 4:
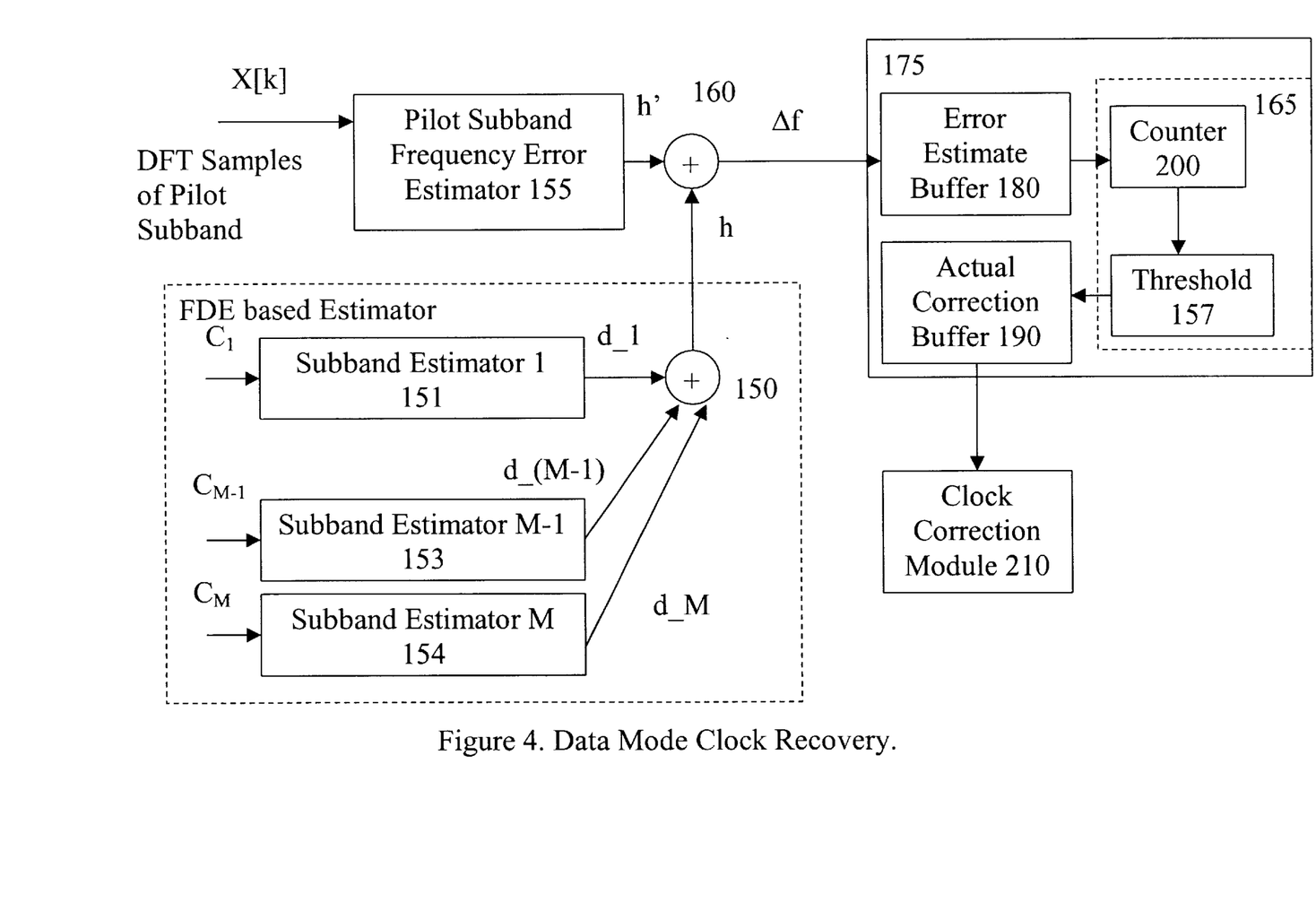
FIG. 4 illustrates the data mode clock recovery scheme in accordance with the present invention.

A preferred implementation of frequency correction during data mode is shown in FIG. 4. The FDE taps in subbands 1,2, . . . , M-1 are denoted by c1, c2, . . . Each of these taps form the input to the sub-band frequency estimators 151, 152, 153, 154, respectively. These estimators measure the frequency of the each subband using the estimator described for the training mode. The correction derived from each of the sub-bands 151, 152, 153 and 154 is combined in the estimator 150. The value estimated in each subband is weighted by the weights di and added in the block 150 to get the FDE based clock error estimate. The procedure for computation of d_i is as described earlier. Note that those subbands that have high SNR receive more weight in this scheme.

The final clock error estimate is computed using the estimate derived using the FDE taps and the one obtained using the pilot frequency. In the particular realization depicted in FIG. 4, the estimate is derived as a linear combination of the two individual estimates. The weights h and h' are chosen based on the confidence in the corresponding estimates. This could be done, for instance, by setting each weight inversely proportional to the corresponding estimation error and normalizing in such a way that the sum of h and h' is unity.

The scheme for computing the clock error estimate using the pilot channel is the same as the one described during the training mode, except that the estimation length is equal to the tracking length N. In case the pilot channel is not available during data mode the same scheme as used for any other subchannel can be applied to this channel too. Block 160 computes the actual estimate of clock correction as a weighted linear combination of the frequency domain equalizer based estimate and pilot based estimate.

Once the difference in transmitter DAC and receiver ADC clock frequency has been reduced to a value below LC, it is impossible to further reduce the difference by sending corrections to the VCXO. The aim then is to see to it that the residual frequency error does not result in the accumulation of a biased phase that in the end would lead to a loss in synchronization. To alleviate this problem, a ditherer 170 is applied which ensures that once the frequency error has achieved an uncorrectably small value, the same does not lead to a persistent oversampling or undersampling as time goes on. The frequency error in the scheme is randomized about zero in such a way that on the whole the system maintains a small zero-mean frequency error.

The ditherer 170 comprises of two cyclic buffers 180, 190 and a dither analyzer 165. The error estimate buffer 180 stores the incoming required correction values, while the actual correction buffer 190 stores the actual corrections imparted for each of the input corrections. If the actual corrections over some instances happen to be zero (i.e., all the corrections computed over this instances have absolute values below LC), the residual frequency error will result in a phase error, which if allowed to build up over time, could cause loss of synchronization. In order to avoid this problem, the dither analyzer 165 sets counter 200 to zero every time the new value written into the actual correction buffer 190 is non-zero. The counter is incremented every time a zero is written into buffer 190. Whenever the count exceeds a predetermined threshold Nc, a threshold detector 157 is activated and the dither analyzer sends a non-zero correction whose magnitude is equal to LC, and sign the same as that of the most recent corrections is given to the clock correction module 210. The correction is written into the actual correction buffer and the counter is reset to zero. The correction is fed to the clock corrector block 210, which implements the correction mechanism.

The numbers N and Nc are chosen in such a manner that the net buildup of phase error during (N*Nc) symbol intervals does not affect the decoding process within the pre-specified error tolerance.

Figure 5:
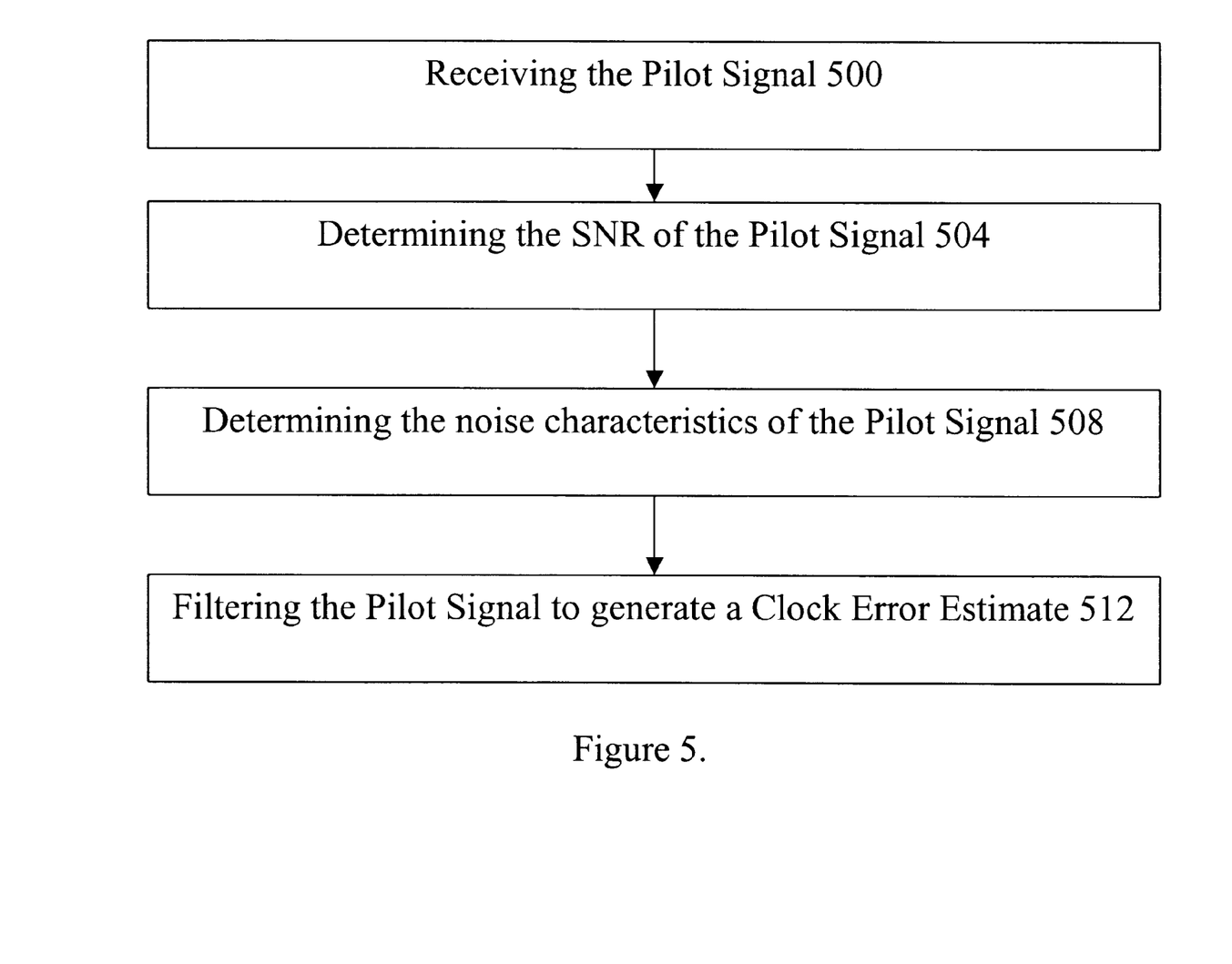
FIG. 5 is a flow chart illustrating the training phase of the present invention.

The following is a description of the methodology of the present invention. FIG. 5 illustrates the methodology of generating an error estimate in a training mode. First, a pilot signal is received 500. Then, the SNR of the pilot signal is determined 504 as described above. Next, noise characteristics of the pilot signal are determined 508. Preferably, the noise characteristics are the autocorrelation values of the received signal. Finally, the Pilot signal is filtered 512 responsive to the SNR, the noise characteristics and a predefined estimation error as described above.

Figure 6:
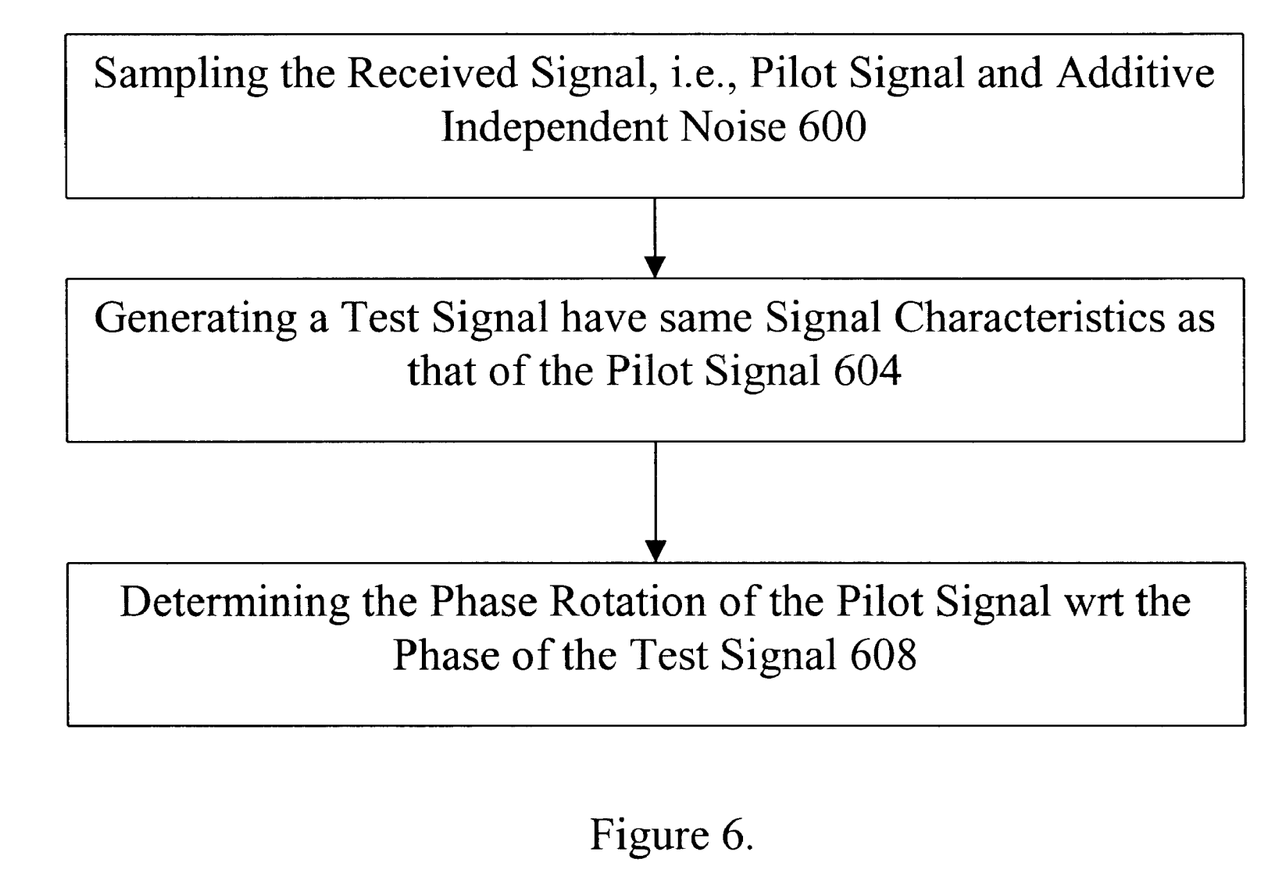
FIG. 6 is a flow diagram illustrating the acquisition of pilot and computation of phase rotation in accordance with the present invention.

As shown in FIG. 6, the method of receiving a pilot 500 comprises of sampling the received signal and accompanying additive noise 600, generating a test signal having same signal characteristics as that of the transmitted pilot signal 604 and determining the phase rotation of the pilot signal with respect to the phase of the test signal 608.

Figure 7:
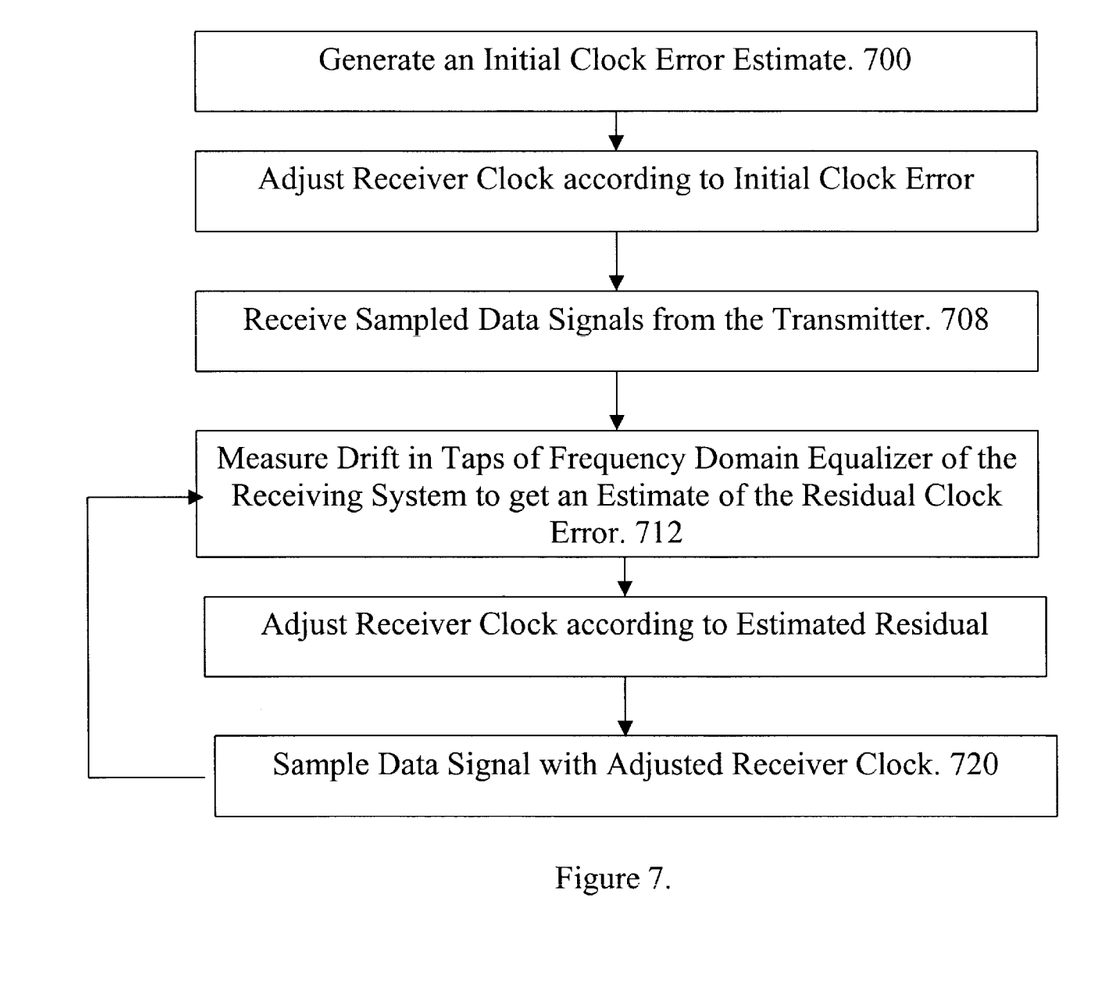
FIG. 7 illustrates the data mode clock recovery scheme in accordance with the present invention.

As explained above and indicated in FIG. 7, the method of correcting residual clock error comprises of generating an initial clock error estimate 700, using this clock error estimate to adjust the receiver clock 704, receipt of data signals sent by the transmitter 708, measuring drift in the taps of an adapting FEQ at the receiver to estimate the residual clock error 712, using this estimate to correct the receiver clock 716 and repeat the process with data sampled using the adjusted receiver clock 720.

Figure 8:
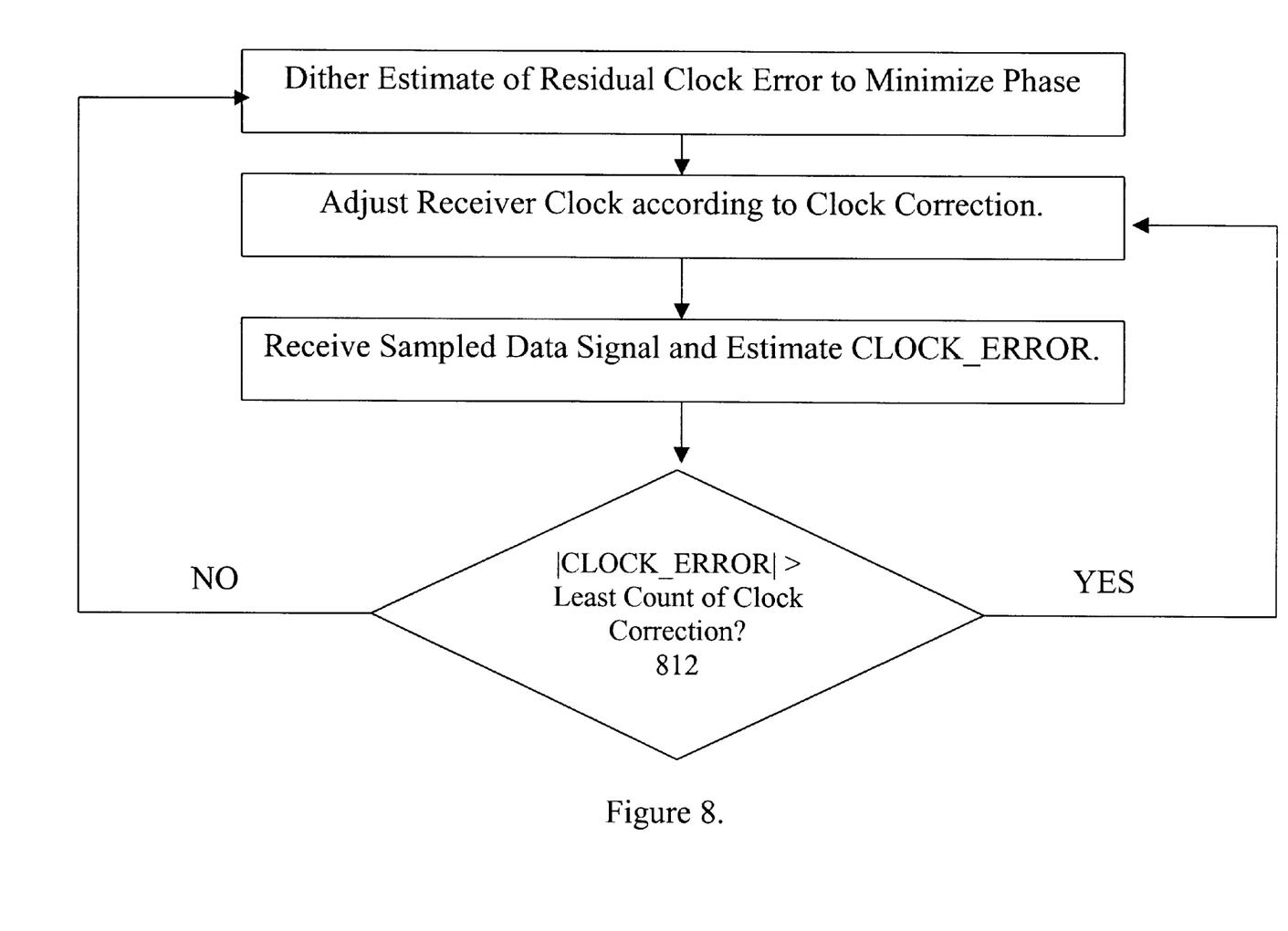
FIG. 8 shows the use of the dithering mechanism whenever the required clock correction is smaller than the Least Count of the correction mechanism in accordance with the present invention.

FIG. 8 is a flow diagram indicating when dithering is used. The estimate of the residual clock error is dithered to minimize the phase error buildup. The dithering method comprises of generating a clock correction 800 which modifies the receiver clock 804 and the modified clock is used to sample the data signal to estimate the residual error 808. If the estimated clock error is smaller than the least count of clock correction 812, it is fed to the dither block to compute the actual correction 800.

Figure 9:
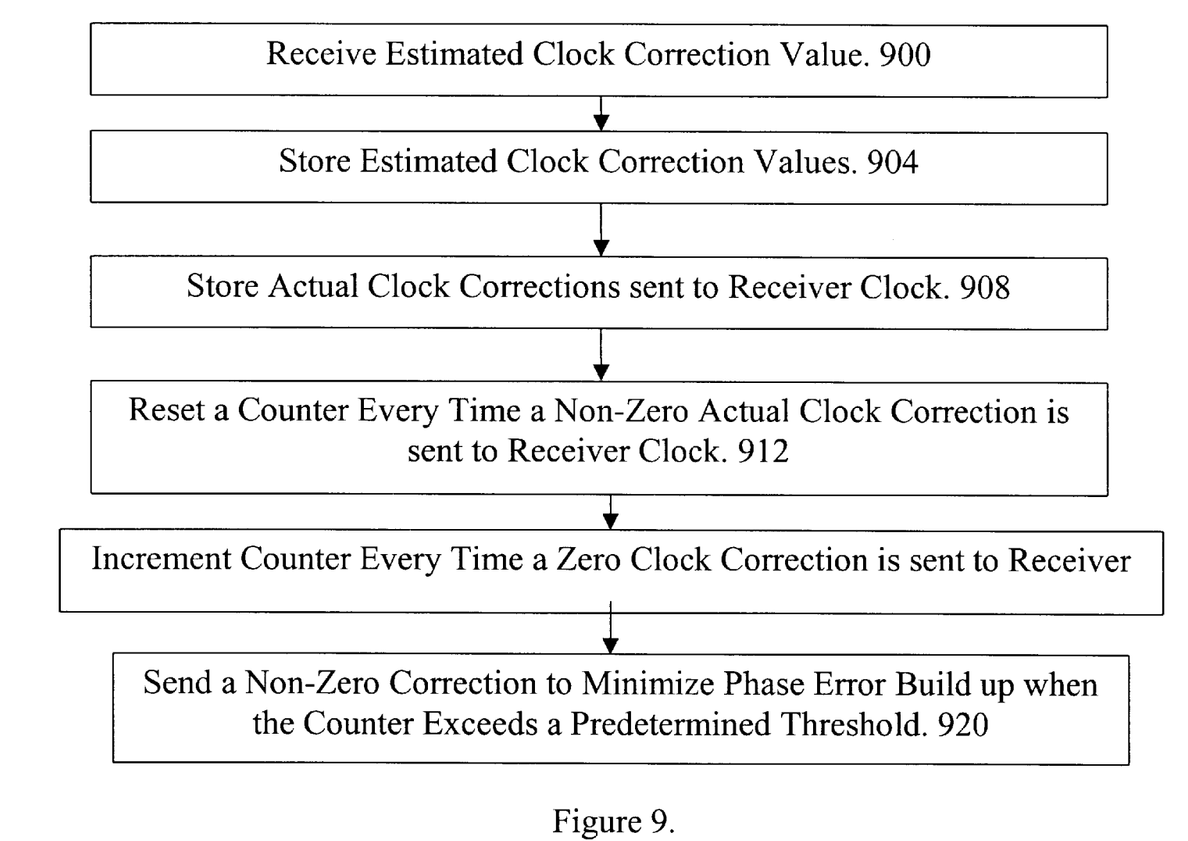
FIG. 9 details the flow of the dithering mechanism in accordance with the present invention.

The dithering mechanism is illustrated in FIG. 9. It involves the steps of receiving the estimated clock correction value 900, storing the estimates 904, storing the actual clock corrections sent to the receiver clock 908, resetting a counter whenever the actual correction sent is non-zero 912, incrementing the same counter whenever the correction sent is zero 916 and sending a non-zero correction to the receiver clock whenever the counter exceeds a predetermined threshold 920.

The above-described embodiment is a preferred embodiment of the invention. The individual estimation strategies used in training and data mode are only representative; other schemes that perform the tasks indicated could replace these without changing the overall nature of the scheme however they may lead to sub-optimal results. The ways in which the schemes are combined depends upon the actual multi-carrier system which may or may not have all the characteristics described above. The procedures will have to be modified depending on these characteristics, and should be obvious to those skilled in the art. Finally, all the above described procedures could either be implemented in hardware or software.

While the present invention has been described with reference to certain preferred embodiments, those skilled in the art will recognize that various modifications may be provided. These and other variations upon and modifications to the preferred embodiments are provided for by the present invention.

What is claimed is:

1. A method for generating a clock error estimate in order to synchronize a receiver clock with a transmission clock in a multi-carrier transmission system in which possibly colored noise is introduced during the transmission of a data signal, comprising:

receiving a pilot signal in a predetermined sub-carrier frequency;

determining the signal-to-noise ratio of the pilot signal;

determining noise characteristics of the pilot signal; and filtering the pilot signal to generate a clock error estimate responsive to the signal-to-noise ratio, the noise characteristics and a predefined estimation error.

2. The method of claim 1 wherein computing the signal-to-noise ratio comprises:

determining discrete Fourier transform coefficients of the pilot signal.

3. The method of claim 1 wherein determining noise characteristics further comprises:

determining discrete Fourier transform coefficients of the pilot signal; and determining autocorrelation statistics of the noise responsive to the determined discrete Fourier transform coefficients.

4. The method of claim 1 in which the receiver clock is generated by a control system further comprising:

generating a predefined estimation error responsive to a least count of the receiver clock control system.

5. The method of claim 1 in which a received pilot test signal further comprising:

sampling the received pilot signal and accompanying noise;

receiving a test signal having signal characteristics of the predetermined pilot signal prior to transmission of the predetermined pilot signal to the receiving system, wherein said test signal is generated locally to the receiving system;

determining a phase rotation of the received pilot signal responsive to comparing a phase of the received pilot signal with a phase of the test signal; and wherein determining a signal-to-noise ratio of the pilot signal further comprises determining the signal-to-noise ratio of the received pilot signal responsive to the phase rotation of the received pilot signal.

6. The method of claim 5 wherein determining noise characteristics of the pilot signal further comprises determining the noise characteristics of the pilot signal responsive to the phase rotation of the received pilot signal.

7. The method of claim 1 further comprising:

sampling the pilot signal;

determining a least count value for the receiving clock system; and wherein filtering the pilot signal to generate a clock error estimate responsive to the signal-to-noise ratio, the noise characteristics and a predefined estimation error further comprises:

computing a number of taps and weights of the taps for a linear estimate filter responsive to the least count value, the signal-to-noise ratio, the noise characteristics, and samples of the pilot signal.

8. The method of claim 7 wherein the samples are delayed prior to computing the taps and weights of the filter.

9. A method of correcting residual clock error in a multi-carrier transmission system in which data signals are transmitted to a receiving system and are sampled in accordance with an output of a receiving clock system, comprising:

generating an initial clock error estimate;

adjusting the output of the receiving clock system responsive to the generated initial clock error estimate;

receiving data signals from the transmission system;

measuring drift in frequency domain taps of the receiving system to obtain an estimate of the residual clock error;

adjusting the receiving clock system output responsive to the estimated residual clock error; and sampling the data signals in accordance with the adjusted receiving clock system output.

10. The method of claim 9 further comprising:

dithering the estimate of the residual clock error to minimize phase error build-up;

and adjusting further comprises:

adjusting the receiving clock system output responsive to the dithered residual clock error estimate.

11. The method of claim 10 wherein dithering the estimate of the residual clock error further comprises:

determining a least count of the receiving clock system;

dithering the estimate of the residual clock error responsive to the residual clock error estimate being below the least count.

12. The method of claim 11 wherein dithering comprises:

receiving estimated clock correction values;

storing the estimated clock correction values;

storing the estimated clock correction values to be transmitted to the receiving clock system;

resetting a counter responsive to a clock correction value to be transmitted being non-zero;

incrementing the counter responsive to a clock correction value to be transmitted being equal to zero;

transmitting a non-zero clock correction to the receiving clock system responsive to a value of the counter exceeding a predetermined threshold.

13. The method of claim 12 wherein the non-zero clock correction transmitted to the receiving clock system has a magnitude equal to the least count value of the receiving clock system and a sign equal to a most recent estimated clock correction transmitted to the receiving clock system.

14. The method of claim 9 further comprising:

receiving a pilot signal;

computing a clock error estimate responsive to the pilot signal;

combining the clock error estimate computed from the pilot signal with the estimated residual clock error; and wherein adjusting further comprises:

adjusting the receiving clock system output responsive to the combined clock error estimate and the residual clock error estimate.

15. An apparatus for generating a clock error estimate in order to synchronize a receiver clock with a transmission clock in a multi-carrier transmission system in which possibly colored noise is introduced during the transmission of a data signal, comprising:

a data sampler, for sampling an input pilot signal of a predetermined carrier frequency in accordance with a clock signal received from a receiver clock system;

a phase rotation analyzer, coupled to the data sampler and a test pilot signal input for comparing a phase of the input pilot signal to a phase of the test pilot signal to determine a phase rotation of the input pilot signal, wherein the test pilot signal has substantially the same phase as the input pilot signal prior to transmission of the input pilot signal;

a signal-to-noise ratio estimator, coupled to the phase rotation analyzer, for computing a signal-to-noise ratio for the input pilot signal responsive to the phase rotation of the input pilot signal;

a noise characteristic estimator, coupled to the phase rotation analyzer, for computing noise characteristics of the input pilot signal responsive to the phase rotation of the input pilot signal;

a linear filter, coupled to the noise characteristic estimator, the signal-to-noise ratio estimator, the phase rotation an analyzer, and to which a least count value of the receiver clock system is input, for computing a number of taps and weights of the taps responsive to the signal-to-noise ratio estimate, the noise characteristic estimate, the least count value, and the samples received from the phase rotation analyzer to generate a linear estimate of the clock error;

the receiver clock system, having a clock control input coupled to the output of the linear filter, for adjusting an output clock signal responsive to the clock error estimate generated by the linear filter.

16. The apparatus of claim 15 wherein the phase rotation analyzer further comprises:

a discrete fourier transform module, coupled to the output of the data sampler, for determining discrete fourier transform coefficients for the input pilot signal;

a rotation comparator, coupled to the discrete fourier transform module and a test pilot signal, for computing a difference in phase between the test pilot signal and the input pilot signal;

a modified phase rotation estimator, coupled to the rotation comparator, for multiplying the difference in phase between the test pilot signal and the input pilot signal with a complex conjugate of a previous sample of the test pilot signal to generate a modified phase rotation value; and an arctan computation block, coupled to the modified phase rotation estimator, for computing a difference between consecutive phase values of the input signal responsive to modified phase rotation value.

17. The apparatus of claim 15 further comprising:

a ditherer, coupled to the linear filter, for receiving the clock error estimate, and generating a dithered clock estimate output responsive to a value of the clock error estimate.

18. The apparatus of claim 17 wherein the ditherer receives a least count value from the receiving clock system, and the ditherer further comprises:

an input cyclic buffer, for receiving and storing the value of the clock error estimate;

an actual correction buffer, coupled to the input cyclic buffer, for receiving the value of the clock error estimate, transmitting a dithered clock correction value to the receiving clock system responsive to receiving a dithered clock correction value from a dither analyzer, transmitting the value of the clock error estimate otherwise, and storing the transmitted clock correction value;

the dither analyzer, coupled to the input cyclic buffer and a counter, for resetting a counter responsive to the value of the clock error estimate being non-zero, incrementing the counter responsive to the value of the clock error estimate being zero, comparing the counter value to a predetermined threshold value, and transmitting a dithered clock correction value to the actual correction buffer responsive the value of the counter exceeding the threshold.

19. The apparatus of claim 18 wherein the dithered clock correction value is a non-zero value.

* * * * *